United States Patent
Srinivasan et al.

(10) Patent No.: US 9,178,196 B2
(45) Date of Patent: Nov. 3, 2015

(54) PACKAGING OF THERMISTOR IN A BATTERY ASSEMBLY

(75) Inventors: Giriraj Srinivasan, Troy, MI (US); Patrick Daniel Maguire, Ann Arbor, MI (US); Kanchana Pentapati, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 626 days.

(21) Appl. No.: 13/605,067

(22) Filed: Sep. 6, 2012

(65) Prior Publication Data

US 2013/0164569 A1    Jun. 27, 2013

Related U.S. Application Data

(60) Provisional application No. 61/578,850, filed on Dec. 21, 2011.

(51) Int. Cl.
| | |
|---|---|
| *H01M 10/637* | (2014.01) |
| *H01M 2/10* | (2006.01) |
| *H01M 2/02* | (2006.01) |
| *H01M 2/06* | (2006.01) |
| *H01M 10/48* | (2006.01) |

(52) U.S. Cl.
CPC .......... *H01M 2/1077* (2013.01); *H01M 2/0217* (2013.01); *H01M 2/0237* (2013.01); *H01M 2/06* (2013.01); *H01M 10/486* (2013.01); *H01M 10/637* (2015.04); *H01M 2220/20* (2013.01); *Y10T 29/49108* (2015.01)

(58) Field of Classification Search
CPC ... H01M 10/637; H01M 2/0237; H01M 2/06; H01M 2/0217
See application file for complete search history.

(56) References Cited

U.S. PATENT DOCUMENTS

| | | | |
|---|---|---|---|
| 7,611,798 B2 | 11/2009 | Yoon et al. | |
| 2009/0041082 A1* | 2/2009 | Paramasivam et al. | 374/152 |
| 2010/0297486 A1* | 11/2010 | Fujii | 429/120 |
| 2011/0024205 A1 | 2/2011 | Nishihara et al. | |
| 2011/0104521 A1 | 5/2011 | Kishimoto et al. | |
| 2011/0104533 A1 | 5/2011 | Seto | |
| 2012/0052359 A1* | 3/2012 | Yoshitake et al. | 429/120 |
| 2012/0189887 A1* | 7/2012 | Hohenthanner et al. | 429/90 |

FOREIGN PATENT DOCUMENTS

| | | |
|---|---|---|
| WO | WO 2010131700 A1 * | 11/2010 |
| WO | WO 2011000458 A2 * | 1/2011 |

* cited by examiner

*Primary Examiner* — Zachary Best
(74) *Attorney, Agent, or Firm* — David B. Kelley; Brooks Kushman P.C.

(57) ABSTRACT

A battery assembly having a plurality of battery modules capable of powering a traction motor of a vehicle. First and second end frames are provided on the battery modules. A plurality of battery cells is disposed between the first and second end frames. The first end frame of one of the battery modules has a first pocket. The second end frame of an adjacent battery module has a second pocket. The first and second pockets are aligned when the battery assembly is assembled to define a receptacle. A thermistor is disposed in the receptacle. The thermistor extends through the first pocket of the first end frame and at least partially into the second pocket of the second end frame.

15 Claims, 2 Drawing Sheets

PACKAGING OF THERMISTOR IN A BATTERY ASSEMBLY

CROSS-REFERENCE TO RELATED APPLICATIONS

This application claims the benefit of U.S. provisional Application No. 61/578,850 filed Dec. 21, 2011 the disclosure of which is incorporated in its entirety by reference herein.

TECHNICAL FIELD

The present disclosure relates to a battery assembly for a vehicle having an electric traction motor.

BACKGROUND

Traction batteries for hybrid electric vehicles (HEVs) or battery-only electric vehicles (BEVs) generally include battery modules stacked adjacent to one another. Each battery module includes multiple battery cells typically stacked between relatively rigid end plates. The stacked modules are assembled to the vehicles, behind the rear row of seats.

The batteries may increase in temperature due to the electrical resistance within the battery cells. Temperature sensors, or thermistors, are placed on or around the batteries to measure the temperature of the batteries for safety and control purposes. Packaging constraints, weight considerations, and other factors lead to size reductions of many parts of the battery cells and modules. The size reduction of these parts must still accommodate thermistors. There exists a need for efficient packaging of a thermistor in battery modules.

SUMMARY

According to one embodiment of the present disclosure, a battery assembly having plurality of battery modules is provided. The battery modules include first and second end frames. The first end frame of one of the battery modules defines a first pocket. The second end frame of an adjacent battery module defines a second pocket. The first and second pockets are aligned to define a receptacle when the two battery modules are adjacent. A plurality of battery cells is disposed between the first and second end frames of each battery module. A thermistor is disposed in the receptacle. The thermistor contacts at least one of the battery cells of one of the battery modules, and extends through the first pocket and at least partially into the second pocket of the adjacent battery module.

According to another embodiment of the present disclosure, a method of assembling a battery assembly is provided. A first battery module is provided, having a first end frame defining an aperture. A thermistor is attached through the opening and onto a battery cell that is disposed within the first battery module. A second battery module is provided, having a second end frame defining a pocket. The second end frame is attached to the first end frame such that the thermistor extends all the way through the opening and at least partially into the pocket.

According to another embodiment of the present disclosure, a battery assembly for a vehicle is provided. A first battery module includes a first end frame defining an aperture formed therein. The first battery module includes a plurality of battery cells. A second battery module is disposed adjacent to the first battery module. The second battery module includes a second end frame adjacent to the first end frame. A thermistor is attached to one of the battery cells of the first battery module. The thermistor extends through the aperture of the first end frame and at least partially into the second end frame of the second battery module.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale, as some features may be exaggerated or minimized to show details of particular components. Specific structural and functional details disclosed herein are therefore not to be interpreted as limiting, but merely as a representative basis for teaching one skilled in the art to variously employ the present invention.

Figure 1:
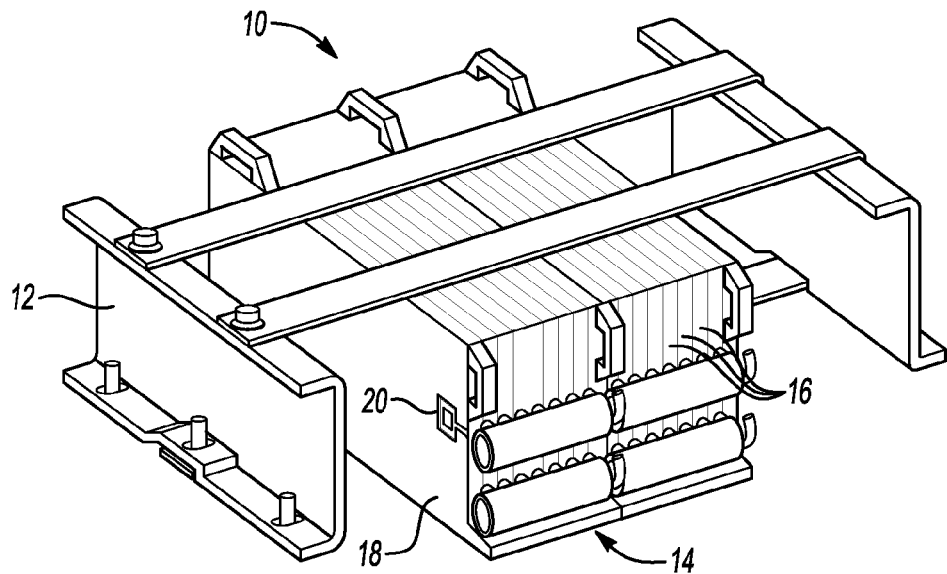
FIG. 1 is a perspective view of a battery assembly including a pair of battery modules having end frames adjacent to one another according to various embodiments of the present disclosure.

Referring to FIG. 1, a battery assembly 10 is provided to power traction wheels of a vehicle (not shown). End plates 12 are provided to mount the battery assembly 10 to a body of the vehicle (not shown). A plurality of battery modules 14 is provided that stack together. Each battery module 14 includes a plurality of battery cells 16 sandwiched between two end frames 18. The end frames 18 of each battery module 14 are able to connect to one another with a snap connection, for example, as will be described with reference to FIG. 5.

It should be understood that the battery modules 14 may be assembled together inside the vehicle. Alternatively, the battery modules 14 may be assembled outside of the vehicle before mounting the end plates 12 to the vehicle frame.

The end frames 18 each include a pocket 20. Each pocket 20 may be an indentation or the like that does not extend all the way through the end frame 18. Alternatively, the pocket 20 may be a hole or an aperture that extends all the way through the end frame 18. The pocket may be any other feature that provides either a partial cavity formed in the end frame 18, or full void extending through the end frame 18. The pocket 20 of one end frame 18 aligns with a pocket 20 of an adjacent end frame 18 of an adjacent battery module 14 when the battery modules 14 are assembled together. The pockets 20 of adjacent end frames 18 need not be the same; for instance, one pocket 20 of one end frame may be an aperture, while the pocket 20 of the adjacent end frame is an indentation. When two battery modules are assembled adjacent to one another, the pockets 20 of the adjacent end frames 18 together define a receptacle, as will be discussed further.

Figure 2:
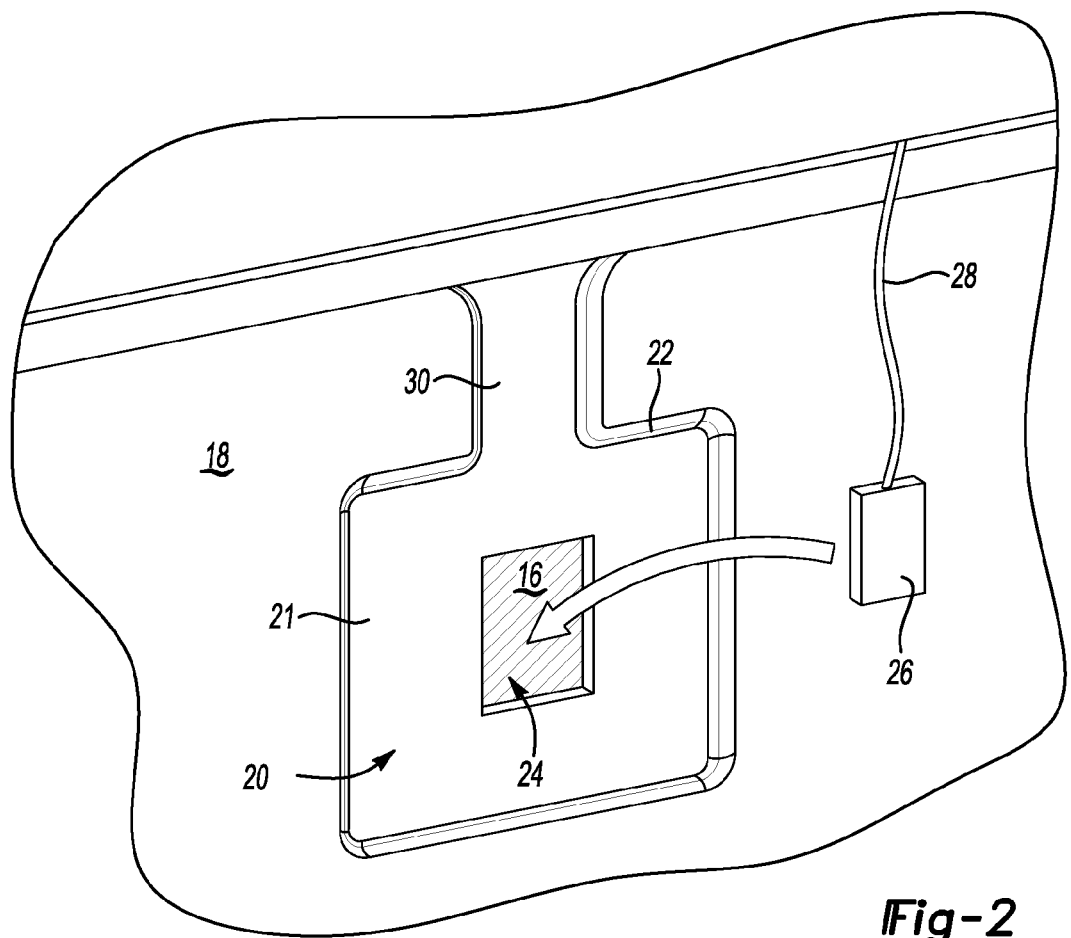
FIG. 2 is a plan view of an end frame of a battery module and a pocket formed on the end frame according to various embodiments of the present disclosure.

Referring to FIG. 2, a pocket 20 formed on an end frame 18 is shown in more detail. The pocket 20 includes an indentation 21, tapered edges 22 and an aperture or a hole 24 that extends through the end frame 18. The hole 24 is sized to receive a thermistor 26. The hole 24 enables the thermistor 26 to contact a battery cell 16 that is disposed within the battery module 14 and adjacent to the end frame 18. Electrical wires 28 are provided that communicate the temperature of the battery cell 16 as detected by the thermistor 26 to a computer or a battery control unit (BCU) (not shown). The BCU uses the temperature information to activate battery cooling or to shut down the battery, for example. The pocket 20 may also include a wire receiving area 30 which is narrow relative to the indentation 21 and may be sized to receive the electric wires 28. When the thermistor 26 is placed in the hole 24, an adhesive, such as tape, may extend over the thermistor 26 and attach to the indentation 21 to hold the thermistor 26 in contact with the battery cell 16.

When two or more battery modules 14 are assembled together, the pockets 20 of adjacent end frames 18 align. The aligned pockets 20 together define a receptacle for the thermistor 26. If the thermistor 26 is thicker than the end frame 18, the receptacle provides clearance for the thermistor 26 to be in contact with one battery cell 16 of one module 14 while also being at least partially disposed in the pocket 20 of the adjacent end frame 18. For example, in one embodiment, the thickness of the thermistor is 2.5 mm while the thickness of each end frame is 2.25 mm. Therefore, the aligning pockets 20 enable the thermistor 26 to extend into the end frame 18 of an adjacent battery module 14.

The adjacent end frame 18 that the thermistor 26 is at least partially disposed within may include a hole 24 to enable the thermistor 26 to read the temperature of two battery cells of two adjacent end battery module. Alternatively, the adjacent end frame 18 that the thermistor 26 is at least partially disposed within may not include a hole, and the indentation 21 may simply act as a receiving area for the thermistor 26 to fit. This enables the thermistor 26 to contact one battery cell 16 while not contacting the battery cell of the adjacent battery module. In one embodiment, the thickness of the indentation on each of the end frames is 0.75 mm. Additional detail of adjacent pockets 20 of end frames 18 of adjacent battery modules 14 is provided with reference to FIG. 3.

Figure 3:
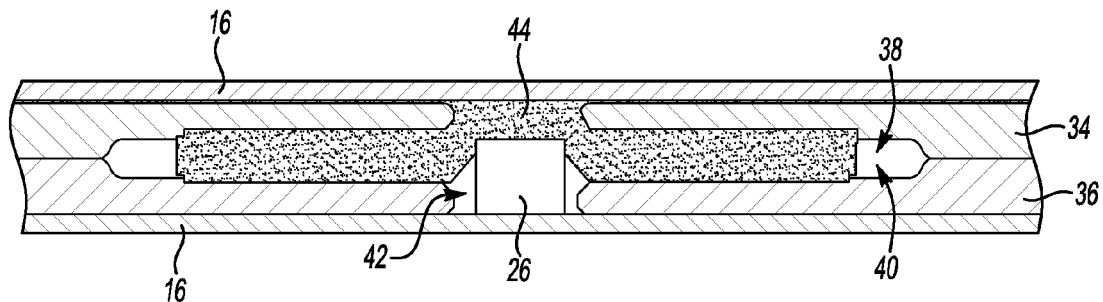
FIG. 3 is a cross-sectional view of adjacent end frames of adjacent battery modules with pockets formed therein to receive a thermistor according to various embodiments of the present disclosure.

Referring to FIG. 3, two adjacent end frames of separate battery modules are shown. A first end frame 34 of one battery module is adjacent to a second end frame 36 of an adjacent battery module. The first end frame 34 includes a first pocket 38 and the second end frame 36 includes a second pocket 40, as previously described with reference to FIGS. 1-2. While the pockets shown in FIG. 3 are illustrated to each include both an indentation and a hole formed in each of the end frames 34, 36, it should again be understood that the pockets 38, 40 can include indentations, holes, and/or any other features that provide at least a partial indentation or void in the end frames 34, 36. A receptacle 42 is defined by the common void in the end frames 34, 36 formed by the aligned pockets 38, 40. A thermistor 26 is disposed in the receptacle 42. The thermistor 26 contacts a battery cell 16 of one of the battery modules 14 for temperature readings. The thermistor 26 may have a thickness that is greater than the thickness of the second end frame 36. The first pocket 38 enables the thermistor 26 to extend through the second end frame 36 and at least partially into the first pocket 38 of the first end frame 34. A layer of foam or other insulator 44 may be provided to at least partially surround the thermistor 26 in order to add durability so that the thermistor 26 can withstand vehicle vibrations, remain in close contact with cell 16, and optionally insulate the thermistor from an adjacent cell or other potentially different temperature sources. In another embodiment, an insulator 44 is not provided, and the first pocket 38 is defined by an indentation and not a hole, such that the thermistor 26 extends from one battery cell 16, through the second pocket 40, and abuts the first end frame in the indentation.

Figure 4:
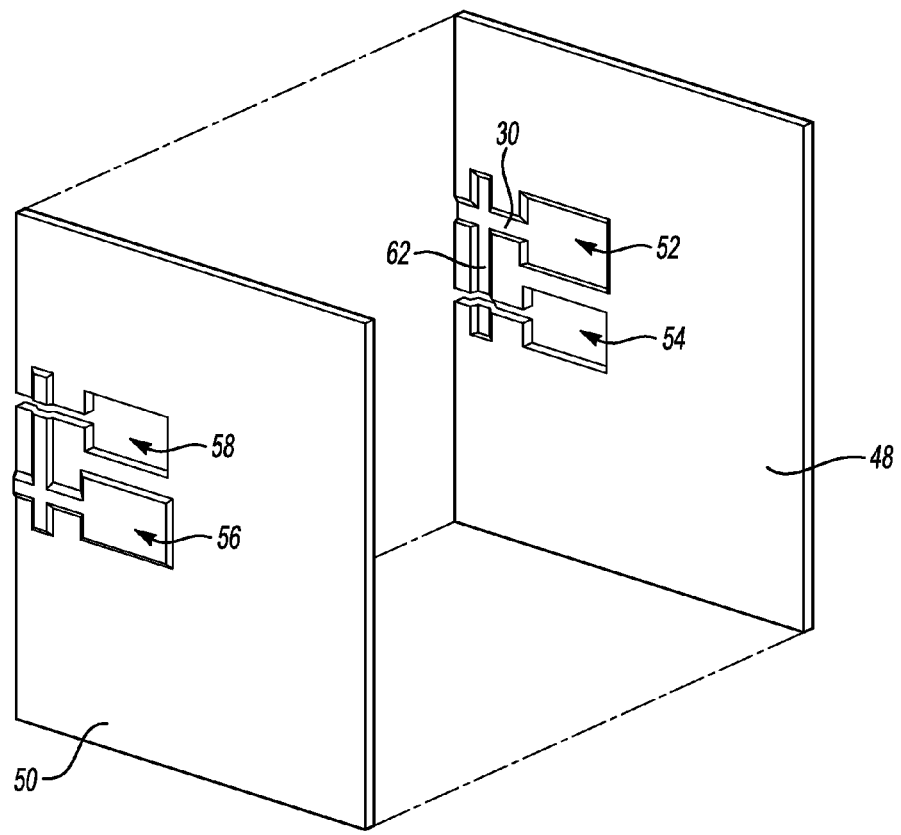
FIG. 4 is an exploded perspective view of adjacent end frames of adjacent battery modules in which each end frame includes two pockets according to one embodiment of the present disclosure.

Referring to FIG. 4, an alternate embodiment is illustrated. First and second end frames 48, 50 are provided as part of separate battery modules 14 (shown separated and not attached). The first end frame 48 includes a first pocket 52 and a second pocket 54. The first pocket 52 is an indentation not extending through the first end frame 48, while the second pocket 54 is a hole extending through the end frame 48. The second end frame 50 of the adjacent battery module includes third and fourth pockets 56, 58 that are respectively aligned with the first and second pockets 52, 54 of the first end frame 48. The third and fourth pockets 56, 58 are inverse to the first and second pockets 52, 54, i.e., the third pocket 56 is an indentation not extending through the second end frame 50 and the fourth pocket 58 is a hole. The inverse location of respective holes and indentation of adjacent end frames 48, 50 enables two thermistors to be utilized between adjacent battery modules. One thermistor extends at least partially through the first pocket 52 (i.e., an indentation) while extending into the fourth pocket 58 (i.e., an a hole). Another thermistor extends through the second pocket 54 (i.e., a hole) to contact a different battery cell, while extending at least partially into the third pocket 56 (i.e., an indentation). This enables the thermistors and the BCU (not shown) to determine temperatures of two separate battery cells 16 of adjacent battery modules 14. It should be understood that while the first and third pockets 54, 56 are indentations, it is contemplated that all four pockets 52, 54, 56, 58 may be holes, and it is further contemplated that insulation may be used consistent with the manner described with respect to the description of FIG. 3.

The end frames 48, 50 may each include a narrower wire-receiving area 30 adjacent to each of the pockets 52, 54, 56, 58, similar to the description of FIG. 2. Electrical connections or wires may be fitted in the wire-receiving areas 30 and adhered to the end frames 48, 50. A separate recessed portion or indentation 62 is also provided that extends across both wire-receiving areas 30. The indentation 62 provides a locating feature for an adhesive to be placed over the wires that connect the thermistors to the BCU.

Figure 5:
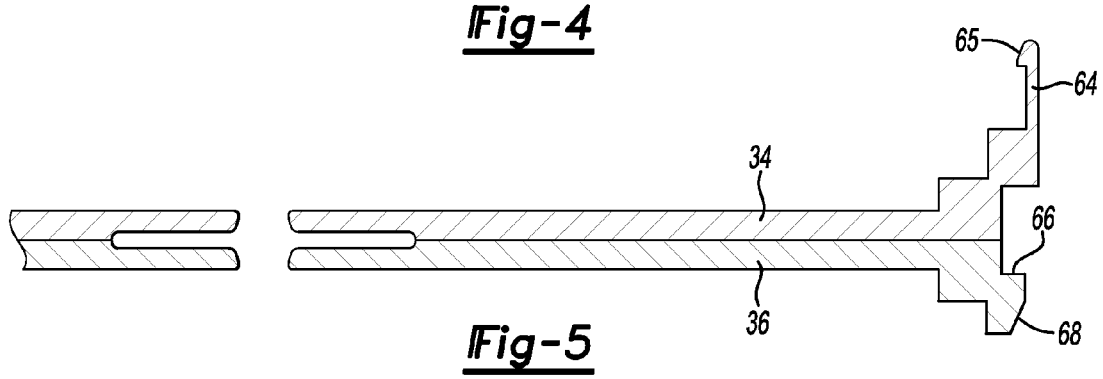
FIG. 5 is a cross-sectional view of adjacent end frames of adjacent battery modules in which one end frame has a protrusion and the adjacent end frame has a receptacle for receiving the protrusion and attaching the end frames together, according to various embodiments of the present disclosure.

Referring to FIG. 5, first and second end frames 34, 36 are shown in isolation. The first end frame 34 includes a protrusion 64. The protrusion 64 is an extension of the end frame and includes a tapered head 65 on the end of a tang. The second end frame 36 includes a corresponding receptacle or ledge 66. The second end frame 36 also includes a tapered portion 68 that tapers toward the ledge 66. The tapered portion 68 is located slightly outward than the head 65 of an adjacent battery module. When battery modules 14 connect in an array, the tapered head 65 of the first end frame 44 of one module slides along the tapered portion 68 of the second end frame 46 of an adjacent module, bending the protrusion 64 slightly outward, until the head 65 reaches the ledge 66. Once the head 65 reaches the ledge 66, the protrusion "snaps" inward, with the head 65 resting on top of the ledge 66.

Referring to FIGS. 1 and 5, each end frame of each module may include either a protrusion 64 or a ledge 66, such that a stacked array of battery modules 14 can be accomplished during assembly of the battery assembly 10 into the vehicle.

Battery modules 14 may be assembled one-by-one to adjacent battery modules 14 with protrusions 64 snap-fitting onto corresponding ledges 66 of adjacent modules 14. The end plates 12 may also include protrusions or ledges for a battery module 14 to assemble to. It should be understood that instead of protrusions 64 and ledges 66, any other connecting mechanism may be utilized that enables quick connection of a first end frame 44 of one battery module 14 to assemble to a second end frame 46 of an adjacent battery module. One other such connecting mechanism contemplated includes a male plug into a female socket.

While exemplary embodiments are described above, it is not intended that these embodiments describe all possible forms of the invention. Rather, the words used in the specification are words of description rather than limitation. It is also contemplated that various embodiments of the present disclosure may be combined or rearranged to achieve a specific result. Furthermore, to the extent that particular embodiments described herein are described as less desirable than other embodiments or prior art implementations with respect to one or more characteristics, the other embodiments and the prior art implementations are not outside the scope of the disclosure and may be desirable for particular applications.

What is claimed is:

1. A battery assembly comprising:
   a plurality of battery modules having first and second end frames, wherein the first end frame of one of the battery modules defines a first pocket, and the second end frame of an adjacent battery module defines a second pocket;
   a plurality of battery cells disposed between the first and second end frames; and
   a thermistor extending through the first pocket to contact at least one of the battery cells of the one of the battery modules, and further extends only partially into the second pocket of the adjacent battery module.

2. The battery assembly of claim 1, wherein one of the first and second pockets defines an opening extending through the end frame such that the thermistor contacts one of the battery cells.

3. The battery assembly of claim 1, wherein the first and second pockets are defined by openings that are aligned in the first end frame of the one of the battery modules and the second end frame of the adjacent battery module respectively.

4. The battery assembly of claim 1, further comprising a second thermistor, wherein the first end frame includes a third pocket disposed therein, the second end frame has a fourth pocket disposed therein aligned with the third pocket to define a second receptacle, and wherein the second thermistor is disposed in the second receptacle.

5. The battery assembly of claim 4, wherein the first thermistor contacts one of the battery cells of the one of the battery modules and extends partially into the second pocket, and wherein the second thermistor contacts one of the battery cells of the adjacent battery module and extends partially into the third pocket.

6. The battery assembly of claim 1, further comprising an insulator disposed in the receptacle that partially surrounds the thermistor.

7. The battery assembly of claim 1, wherein at least one of the first and second pockets includes a thermistor recess, and a wire conduit recess adjacent to the thermistor recess and extending from the thermistor recess, wherein the thermistor recess is wider than the wire conduit recess.

8. The battery assembly of claim 7, wherein the at least one of the pockets further includes an adhesion recess extending generally transverse to the wire conduit recess, and the battery assembly further comprises an adhesive disposed in the adhesion recess for adhering wire conduits to the wire conduit recess.

9. A method of assembling a battery assembly, comprising:
   attaching a thermistor to a battery cell disposed within a first battery module through an aperture in a first end frame; and
   attaching a second end frame defining a pocket of a second battery module to the first end frame such that the thermistor extends all the way through the aperture and only partially into the pocket.

10. The method of claim 9, wherein the pocket is an indentation.

11. The method of claim 9, further comprising adhering an insulator to the first end frame to at least partially cover the thermistor.

12. A battery assembly for a vehicle, comprising:
   a first battery module including a plurality of battery cells and a first end frame defining an aperture;
   a second battery module adjacent to the first battery module and having a second end frame adjacent to the first end frame; and
   a thermistor attached to one of the battery cells, wherein the thermistor extends through the aperture and only partially into the second end frame.

13. The battery assembly of claim 12, wherein the thermistor has a thickness greater than a thickness of the first end frame.

14. The battery assembly of claim 12, wherein the second battery module includes a plurality of battery cells, and the battery assembly further comprises an insulator disposed between the thermistor and one of the battery cells of the second battery module.

15. The battery assembly of claim 12, wherein the second end frame defines an indentation, and the thermistor extends through the aperture of the first end frame and into the indentation of the second end frame of the second battery module.

\* \* \* \* \*